(No Model.)
C. WOOD.
PLOW.
No. 307,369. Patented Oct. 28, 1884.
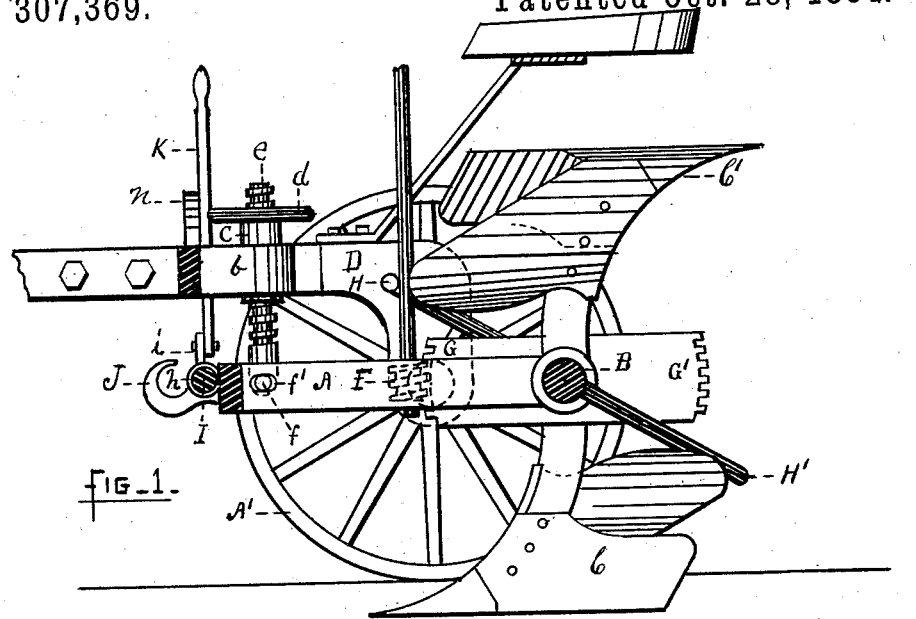
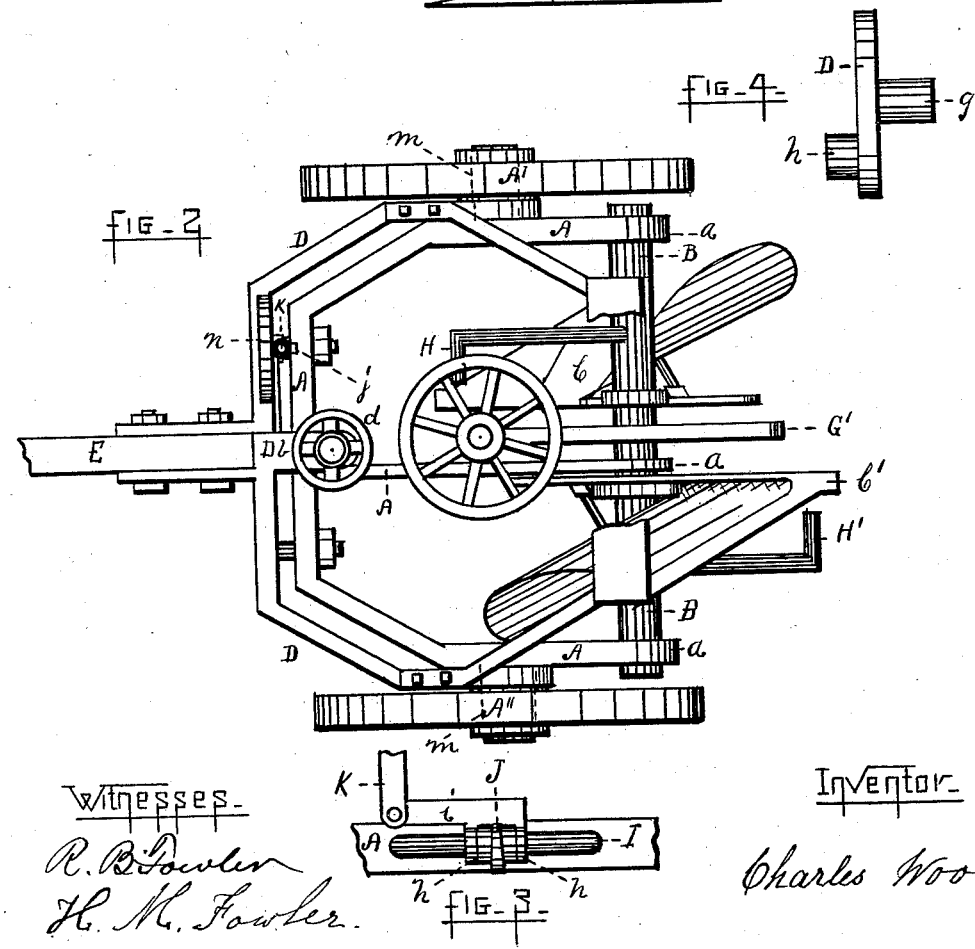
Witnesses
R. B. Fowler
H. M. Fowler
Inventor
Charles Wood

UNITED STATES PATENT OFFICE.

CHARLES WOOD, OF WORCESTER, MASSACHUSETTS.

PLOW.

SPECIFICATION forming part of Letters Patent No. 307,369, dated October 28, 1884.

Application filed May 31, 1883. (No model.)

*To all whom it may concern:*

Be it known that I, CHARLES WOOD, a citizen of the United States, residing at Worcester, in the county of Worcester and State of Massachusetts, have invented a new and useful Improvement in Plows, of which the following is a specification.

My invention relates to that class of plows in which a right and left hand plow are rigidly attached to a revolving beam or shaft; and it consists in revolving the plows in a plane parallel with the line of draft, instead of at right angles thereto, as is commonly done; also, in placing the plows on opposite sides of the center of the revolving beam, so that in operation the right-hand plow may be brought nearest the right-hand wheel and the left-hand plow nearest the left-hand wheel; in means for revolving the plows; in means for raising and lowering the plows so as to regulate the depth of the furrow; in means for raising and lowering the point of the plow in operation; also, in means for bringing the "line of draft" in line with the right or left hand plows, as may be required.

In the accompanying drawings, Figure 1 shows a sectional view of my improved plow; Fig. 2, a top view of the same. Fig. 3 is a view of the device for changing the line of the draft, and Fig. 4 shows a portion of the frame D.

Similar letters refer to similar parts in the several views.

A is a frame supported by the wheels A' A'', and having the three bearings a a a, in which the shaft or beam B revolves, carrying the right and left hand plows C and C', attached rigidly to the opposite sides of the revolving beam B. These plows may be attached to the center of the beam and directly opposite to each other, with the devices for operating suitably attached to the end of the beam B; but I prefer to arrange the plows upon each side of the center of the beam, placing the wheels farther apart and bringing each plow in proper position to take a furrow, while its corresponding wheel runs in the furrow previously made. The bearings upon which the wheels A' A'' turn are attached to the frame A, and passing through the frame D, as shown by the broken lines m m in Fig. 2.

The projection b carries a revolving nut, c, and hand-wheel d, which actuates the screw e, attached by means of the stud f and slot f' to the frame A. The screw e serves to raise or lower the forward end of the frame A, which will elevate or depress the rear end with the plows, and thereby regulate the depth of the furrow. It is not necessary that the axis of rotation of the frame A should coincide with the axis of the wheels A' A''; but studs may project from opposite sides of the frame D, as shown in Fig. 4, the stud g forming the bearing of the wheel and the stud h that of the frame A. I adopt this construction when I desire to use larger wheels than are permitted by the plan shown in Fig. 2. After the furrow has been turned by the right-hand plow C in the position shown in Figs. 1 and 2, the beam B is rotated by means of the worm F, held by the frame A, and actuating the segment G. The rotation of the beam is continued after the segment G has left the worm F by placing the foot upon the bent lever H, which raises the lever H', so it may be conveniently seized by the hand and the semi-rotation of the beam B completed, bringing the segment G' into gear with the worm F, which securely holds the plow, and also permits the point of the plow in operation to be slightly raised or depressed, so as to bring the plow into proper position.

Sliding upon the rod I at the front of the frame A is the hook J, to which the draft is applied. The hook J is inclosed between the sliding collars h h, attached to the plate i, whose opposite end is pivoted to the lower end of the lever K, turning upon the pivot j, by means of which the hook J is moved to the right or left, so as to bring the draft in line with the plow in operation.

The lever K may vibrate against the arc n and be held in position by pins, notches in the arc, or by any of the well-known methods.

Either of the plows may be used continuously, or both used alternately; or, if desired, but one plow may be attached to the beam, and the worm F employed to rotate the beam and bring the plow out of the ground.

Instead of the segments G G', a continuous gear may be used, and in place of the screw e and nut c a cam and lever or other suitable device for depressing the frame may be employed.

What I claim as my invention, and desire to secure by Letters Patent, is—

1. The rocking frame A, consisting of three parallel bars joined at their front ends, and having at their rear ends the bearings *a a a*, carrying a rotating plow beam or shaft, said frame being pivoted in the supporting-wheels, the plow beam or shaft B, carrying right and left plows C C′, supporting-wheels A′ A″ on the pivots of the rocking frame A, and carriage-frame D, supported on the pivots of the rocking frame A, all combined and operating as set forth.

2. The combination, with the rotating plow beam or shaft B, carrying right and left plows C C′, of the geared segments G G′, attached to said beam, and worm F, held in the framework of the plow, said segments G G′ being of sufficient length to allow the worm to raise the plow in action free from the ground, and then release it and allow the rotation of the plow-beam to be continued by other means, as set forth.

3. The combination, with the rotating plow beam or shaft B, carrying one or more plows, C C′, of geared segments G G′, worm F, and radial arms or levers H H′, as and for the purpose set forth.

4. The combination, with a rotating plow-beam, B, carrying one or more plows, C C′, placed on opposite sides of the center line of draft, of a shifting device consisting of rod I, sliding hook J, sliding collars *h h*, attached to the plate *i*, and pivoted lever K, as and for the purposes set forth.

5. The combination of carriage-frame D, supporting-wheels A′ A″, pivoted frame A, having bearings *a a a*, rotating plow-beam B, right and left plows C C′, segments G G′, radial levers H H′, nut *c*, rotating in the frame D, and screw *e*, attached to plow-frame A, all arranged and operating as and for the purpose set forth.

CHARLES WOOD.

Witnesses:
R. B. FOWLER,
GEO. E. SMITH.